United States Patent [19]

Sato et al.

[11] Patent Number: 5,204,193
[45] Date of Patent: Apr. 20, 1993

[54] RECORDING MAGNETOOPTICAL RECORDING MEDIUM

[75] Inventors: Masatoshi Sato, Tokyo; Hideki Akasaka, Kanagawa, both of Japan

[73] Assignee: Nippon Kogaku K.K., Tokyo, Japan

[21] Appl. No.: 734,119

[22] Filed: Jul. 25, 1991

Related U.S. Application Data

[63] Continuation of Ser. No. 246,015, Sep. 14, 1988, abandoned, which is a continuation of Ser. No. 14,126, Feb. 5, 1987, abandoned, which is a continuation of Ser. No. 907,167, Sep. 15, 1986, abandoned, which is a continuation of Ser. No. 703,947, Feb. 21, 1985, abandoned.

[30] Foreign Application Priority Data

Feb. 22, 1984 [JP] Japan ................................. 59-31903

[51] Int. Cl.$^5$ .............................................. G11B 5/66
[52] U.S. Cl. ..................................... 428/694; 360/131; 365/122; 369/13; 428/900
[58] Field of Search ............... 428/694, 900, 678, 928; 360/131, 135; 369/13, 288; 430/945; 365/122

[56] References Cited

U.S. PATENT DOCUMENTS

| | | | |
|---|---|---|---|
| 4,347,112 | 8/1982 | Togami | 427/755.2 |
| 4,518,657 | 5/1985 | Yanagida | 428/446 |
| 4,556,291 | 12/1985 | Chen | 369/13 |
| 4,559,573 | 12/1985 | Tanaka et al. | 428/131 |
| 4,670,353 | 6/1987 | Sakurai | 428/606 |
| 4,753,853 | 6/1988 | Sato et al. | 428/694 |

FOREIGN PATENT DOCUMENTS

| | | | |
|---|---|---|---|
| 051296 | 5/1982 | European Pat. Off. | |
| 074843 | 6/1981 | Japan . | |
| 150952 | 6/1981 | Japan . | |
| 153546 | 11/1981 | Japan . | |
| 78652 | 5/1982 | Japan . | |
| 073746 | 5/1983 | Japan . | |
| 60745 | 4/1984 | Japan | 360/131 |

OTHER PUBLICATIONS

Taylor et al; J. Appl. Phys. vol. 48 No. 1, p. 358 Jan. 1977.
Chen et al; J. App. Phys. vol. 49 No. 3 p. 1758 Mar. 1978.
Kobayashi, et al., "Magnetization Process of Exchange-Coupled Ferrimagnetic Double-Layered Films," Jap. J. App. Phy. vol. 20, No. 11, Nov. 1981 pp. 2089-2095.
Chen, C. T. et al., "Magnetic Properties of Bias-Sputtered Gd-Co-Fe Amorphous Films With Uniaxial Perpendicular Anisotropy," J. App. Phys. 49(3) Mar. 1978, pp. 1756-1758.
Taylor et al; J. of App. Phys. vol. 48 No. 1, p. 358 Jan. 1977.
Takenouchi et al; J. of Appl. Phys. vol. 55 No. 6 p. 2167 Mar. 1984.

*Primary Examiner*—Paul J. Thibodeau
*Assistant Examiner*—R. Follett
*Attorney, Agent, or Firm*—Finnegan, Henderson, Farabow, Garrett & Dunner

[57] ABSTRACT

A Curie temperature (Tc) writing magnetooptical recording medium which uses a dual perpendicular magnetic layer is composed of a first layer having a low Curie point (TL) and a high coercive force (HH) and a second layer having a relatively high Curie point (TH) and low coercive force (HL) and wherein data is written by applying an external magnetic field to the medium which is heated to a temperature higher than the low Curie point (TL) and lower than the high Curie point (TH). The Tc writing magnetooptical recording medium is characterized in that both the first and second layers are made of an RE-Fe-Co amorphous alloy, wherein the RE represents at least one rare earth metal selected from the group consisting of Tb, Dy, Gd and Ho.

12 Claims, 1 Drawing Sheet

RECORDING MAGNETOOPTICAL RECORDING MEDIUM

This application is a continuation of application Ser. No. 07/246,015, filed Sep. 14, 1988, (now abandoned) which is a continuation of application Ser. No. 07/014,126, filed Feb. 5, 1987 (now abandoned), which is a continuation of application Ser. No. 06/907,167, filed Sep. 15, 1986 (now abandoned), which is a continuation of application Ser. No. 06/703,947, filed Feb. 21, 1985 (now abandoned).

BACKGROUND OF THE INVENTION

1. Field of the Invention

This invention relates to a magnetooptical recording medium with which writing, reading, and erasing of information are performed through application of a laser beam.

2. Description of the Prior Art

In recent years, a substantial amount of effort has been directed toward the development of an optical recording medium which satisfies various requirements including high density, large capacity and high speed access.

Of a wide range of optical recording media, magnetooptical recording medium is most attractive due to its unique advantage that information can be erased after use and new information can be written thereon (see U.S. Pat. No. 3,965,463).

The magnetooptical recording medium comprises a glass or plastic disk substrate and a perpendicular magnetic tion layer as a recording material which is formed on the substrate.

In general the recording medium has a concentric circular or spiral recording track, the direction of magnetization of which track is entirely forced to be for example downward (or upward) by a strong external magnetic field before writing an information. An information can be written with a presence and/or length of pit having a reversed, for example upward (or downward), magnetization against the primary direction of magnetization.

Principle of pits formation

In the pits formation, a feature of laser, superb coherence in space and time, are advantageously used to focus a beam into a spot as small as the diffraction limit determined by the wavelength of the laser light. The focused light is applied to the disk surface to write data by producing pits less than 1 μm in diameter on the surface, or to retrieve the stored information from a video or audio disk. In the optical recording, a recording density up to around $10^8$ bit/cm$^2$ can be theoretically attained, since a light beam can be concentrated into a spot with a diameter as small as its wavelength.

As shown in FIG. 1, in a magnetooptical recording, a laser beam (L) is focused onto a recording layer 2 to heat its surface while a bias magnetic field (Hb) is externally applied, so that magnetization (M) in the locally heated surface area can be aligned in the direction of the bias magnetic field. As a result, reversely magnetized pits (P) are formed. The magnetic field strength required to reverse the magnetization (M) in a recording layer 2, the minimum magnetic field strength that is coersive force (Hc) capable of forming pits varies with temperature; generally this field strength (Hc), decreases as the temperature increases.

Even a weak magnetic field otherwise unsuitable for pits formation at room temperature can thus be used for recording if the recording layer 2 is heated to lower Hc.

Ferromagnetic and ferrimagnetic materials differ in the temperature dependencies of M and Hc. Ferromagnetic materials have Hc which decreases around the Curie temperature, and recording is performed based on this phenomenon; thus it is referred to as Tc recording (Curie temperature recording).

By contrast, ferrimagnetic materials have a compensation temperature, below the Curie point, at which magnetization (M) becomes zero. Since Hc drastically changes around this temperature, data recording by means of light becomes possible. This process is called the Tcomp. recording (compensation temperature recording). However, it is possible to perform recording on ferrimagnetic materials by Tc recording.

Principle of reading

FIG. 2 illustrates the principle of data reading based on the magnetooptical effect. Light is an electromagnetic wave with an electromagnetic-field vector normally emanating in all directions on the plane perpendicular to the light path. When light is converted to linear polarized beams and applied onto a recording medium, it is reflected by the surface or passes through the recording layer 2; at this time the plane of polarization rotates according to the direction of magnetization (M).

For example, if the polarization plane rotates $\theta_k$ degrees for upward magnetization, it rotates $-\theta_k$ degrees for downward magnetization. Therefore, if the axis of a light analyzer is set perpendicular to the plane inclined at $-\theta_k$ degrees to the recording surface, the light reflected by a downward-magnetized surface area cannot pass through the analyzer, whereas the light reflected by an upward-magnetized pit (P) can be captured by the detector for an amount of sin ($2\theta_k$). As a result, upward-magnetized pits show up brighter than downward-magnetized areas.

S. Tsunashima proposed a magnetooptical recording medium using a double-layered perpendicular magnetic layer (see Japanese Unexamined Published Patent Application No. 78652/1982). The magnetic layer consists of a first layer having a low Curie point (TL) and a high coercive force (HH) and a second layer having a relatively high Curie point (TH) and low coercive force (HL). The operating principles of Tsunashima's medium are as follows. Upon irradiation with a laser beam, the medium is heated to a temperature higher than the low Curie point (TL) and lower than the high Curie point (TH). This causes the coercive force of the second layer to be reduced to an appreciably low level, though it may not be zero. Then, a stronger bias magnetic field (Hb) is applied to reverse the direction of magnetization in the second layer, thereby writing data into that layer. Since the second layer initially has a low coercive force (HL), a strong bias magnetic field need not be used to write data into this layer. Furthermore, the medium need not be heated up to the high Curie point (TH), but simply to a temperature higher than the low Curie point (TL), and this permits the use of a low-power laser for data write.

When the laser beam is removed, the medium cools down rapidly. As soon as the temperature of the first layer decreases below TL, the magnetization in the first layer is reversed by the already reversed magnetization in the second layer since the coercive force of the first layer still remains zero. This completes the writing of data in the first layer, which is generally referred to as TC writing. The recorded information is preserved by the first layer having high coercive force (HH), because even if a great external magnetizing force (He) comes near the medium accidentally, the magnetization in the first layer will not be reversed again, thereby preventing the loss of the already formed pits (erasure of the recorded information). Therefore, the medium proposed by S. Tsunashima depends principally on the first layer for data recording and is classified as a TC writing system.

In reproduction mode, a stronger light should be used since the S/N ratio of the reproduced information is proportional to I or its square root, I being the intensity of the reproduction light. However, the greater the intensity of the light, the more elevated the temperature of the medium. The value of $\theta_k$ is decreased as the temperature of the medium becomes closer to the Curie point. Since the S/N ratio is generally in proportion to $\theta_k$, the intensity (I) of the reproduction light may not be rendered too great if one wants to achieve a high S/N ratio. Particular care must be taken to reproduce data at a temperature (TR) lower than TL since the coercive force of the first layer becomes zero if its temperature is at TL. The value of $\theta_k$ of the first layer may be reduced, but the second layer whose Curie point (TH) is higher than TL retains a satisfactorily high $\theta_k$. Therefore, information can be reproduced from Tsunashima's medium at a TR higher than allowed for a single-layered medium without suffering from a decrease in $\theta_k$. This permits the use of a reproduction light having a correspondingly enhanced intensity, thereby providing an increased S/N ratio ($\propto \sqrt{I \times \theta_k}$ or $I \times \theta_k$).

As shown above, the recording medium proposed by S. Tsunashima has excellent features. With this medium, information is temporarily recorded in the second layer before it is finally transferred to (replicated in) the first layer, and for this purpose, a high interface wall energy density ($\delta\omega$) is necessary. During the reproduction mode, an unwanted external magnetic filed He (e.g. leakage flux from the actuator or the recording permanent magnet in a record/reproduce pickup) may accidentally come close to pits. If the direction of the approaching external magnetic field is opposite the direction of magnetization in the pits in the second layer, such pits are erased since this second layer has a low Hc. If the direction of the external magnetic field is parallel to that of magnetization in the pits, the magnetization in the area around the pits which has been heated considerably by the laser beam is reversed by He, causing excessive enlargement of the pits. In either case, the S/N ratio drops and erroneous reproduction occurs. These troubles are absent from the first recording layer since, as already mentioned, it has a large Hc. If there exists a high interface wall energy density between the first and second layers, the pits in the second layer are protected by those in the first layer, and as a result, the former pits will be neither erased nor enlarged by He. Therefore, the interface wall energy density is desirably as high as possible so as to enable reliable recording with the magnetooptical recording medium of the double-layered structure.

In order to avoid the risk of erasure or excessive enlargement of the pits in the second layer by He, either one of the following relations 1 and 2 must be satisfied.

$$\frac{\delta'\omega}{2Ms_2't_2} + Hc_2' > He \quad (1)$$

if the direction of the magnetization in the first layer is parallel to that in the second layer

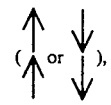

and $$\frac{\delta'\omega}{2Ms_2't_2} - Hc_2' > He \quad (2)$$

if the two directions of magnetization are anti-parallel

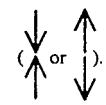

In each formula, $\delta'\omega$ is the interface wall energy density for read mode (when the medium is heated to TR), $Ms'_2$ is the saturated magnetic moment of the second layer (read layer) for read mode, $t_2$ is the thickness of the second layer, and $Hc'_2$ is the coercive force of the second layer for read mode.

Both formulas (1) and (2) dictate that in order to avoid the risk of pit erasure or enlargement in the second layer, the interface wall energy density in read mode ($\delta'\omega$) should be as high as possible. Since the interface wall energy density decreases as the temperature of the medium increases, the formulas also suggest the favor for a high interface wall energy density ($\delta\omega$) at room temperature.

The pits in the first layer should not be erased or excessively enlarged either, even if a magnet or other external magnetic field He' are accidentally brought close to the medium during storage. In order to meet this requirement, the following relation must be satisfied if the direction of magnetization in the first layer is anti-parallel to that in the second layer:

$$\frac{\delta\omega}{2Ms_1t_1} + Hc_1 > H'e \quad (3)$$

wherein $\delta\omega$ is the interface wall energy density at room temperature $Ms_1$ is the saturated magnetic moment of the first layer (preserving layer) at room temperature, $t_1$ is the thickness of the first layer, and $Hc_1$ is the coercive force of the first layer at room temperature. This formula (3) also suggests that the value of $\delta\omega$ at room temperature is preferably as high as possible in order to avoid the risks of pit erasure or enlargement resulting from accidental external magnetic field. Suppose a medium wherein the first layer is made of TbFe with a thickness of 500 Å and the second layer is made of GdFe with a thickness of 500 Å. If TbFe has $Hc_1$ of 3,000 Oe and $Ms_1$ of 117 emu/cm³, an external magnetic field (He') of 3,342 Oe or more will be hazardous if $\delta\omega$ is 0.4 erg/cm². However, if $\delta\omega = 1.6$ erg/cm², no hazard will occur unless He' exceeds 4,368 Oe. This simple example will help one understand that the interface wall energy density (δω) at room temperature is preferably as high as possible in order to avoid the risk of pits erasure or their excessive enlargement due to an accidental external magnetic field.

S. Tsunashima recommends the use of TbFe or DyFe as the material of the first layer and Gd-Fe or Gd-Co as the material of the second layer. However, the present inventors have found that none of the combinations of these materials provide an adequately high value of δω.

SUMMARY OF THE INVENTION

The primary object of the present invention is to improve the Tsunashima invention and provide a higher interface wall energy density (δω) for a Tc writing magnetooptical recording medium having a double-layered structure.

As a result of various studies made to improve the Tsunashima invention, the present inventors have found that a higher level of δω can be attained by using as a material for each of the first and second layers an RE-Fe-Co alloy wherein RE is at least one rare earth metal selected from the group consisting of Tb, Dy, Gd and Ho.

The present invention provides a Tc writing magnetooptical recording medium which uses a dual perpendicular megnetic layer composed of a first layer having a low Curie point (TL) and a high coercive force (HH) and second layer having a relatively high Curie point (TH) and low coercive force (HL) and wherein data is written by applying an external magnetic field to the medium which is heated to a temperature higher than the low Curie point (TL) and lower than the high Curie point (TH), characterized in that both the first and second layers are made of an RE-Fe-Co amorphous alloy, said RE representing at least one rare earth metal selected from the group consisting of Tb, Dy, Gd and Ho.

For the purpose of providing a higher δ107, it is particularly preferred that an election of the first and second layers be made from $RE_\alpha-(Fe_{100-\beta}Co_\beta)_{100-\alpha}$ wherein $\alpha=15-34$ atomic % and $\beta=5-90$ atomic %.

The specific type of the RE-Fe-Co alloy to be used as the material of the first or second layer should be determined by comparing the Curie points (Tc) and coercive forces (Hd) of two preselected alloy compositions. Speaking of the rare earth metals alone, Tc decreases in the order of Gd>Tb>Dy>Ho, whereas Hc decreases in the order of Dy≃Tb>Gd. Varying the proportions of Fe and Co causes a change in Tc, but Hc is substantially insensitive to varying Fe to Co proportions.

If DyFeCo and GdFeCo are selected and if their respective compositions are written as $Dy_{\alpha'}(Fe_{100-\beta'}Co_{\beta'})_{100-\alpha'}$ and $Gd_{\alpha''}(Fe_{100-\beta''}Co_{\beta''})_{100-\alpha''}$ wherein $\alpha'=15-33$ atomic %, $\beta'=5-30$ atomic %, $\alpha''=16-34$ atomic % and $\beta''=5-90$ atomic %, DyFeCo has a lower Tc and a higher Hc than GdFeCo.

The direction of magnetization in the first layer is either parallel or anti-parallel to that in the second layer depending upon the specific types of the materials of which the two layers are made. In the parallel case, pits can be distinguished by the symbols

on the asumption that the first layer overlies the second layer. In the anitparallel case, the symbols

may be used. In the former case, one symbol, for example,

will represent the direction of magnetization in the pits whereas the other symbol

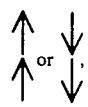

refer to the direction of magnetization in the base.

Each of the first and second layers has a thickness of 100-10,000 Å, preferably between 100 and 1,000 Å. Therefore, both layers should be formed by a suitable thin-film technique such as vacuum evaporation, sputtering or ion plating. The two layers are preferably formed successively without breaking the vacuum created in the formation of the underlying layer. The first layer need not have a distinct boundary with the second layer and an inhomogeneous intermediate layer wherein the first layer gradually changes in composition to the second layer may be formed.

The perpendicular magnetic layer composed of the first and second layers may be formed directly on a substrate such as glass or plastics. Alternatively, that layer may be formed on a protective layer preliminarily formed of an oxide such as $S_iO_2$, $S_iO$, $Ta_2O_5$, $T_iO_2$ or $ZrO_2$, a nitride such as AlN or $Si_3N_4$, a carbide such as SiC or Tic, or a hard coat made of a polysiloxane compound. The perpendicular magnetization layer may be overlaid with a protective layer or a reflective layer. If desired, a reflective layer may be formed over the magnetization layer with a protective layer disposed between the two.

DESCRIPTION OF THE PREFERRED EMBODIMENTS

Figure 1:
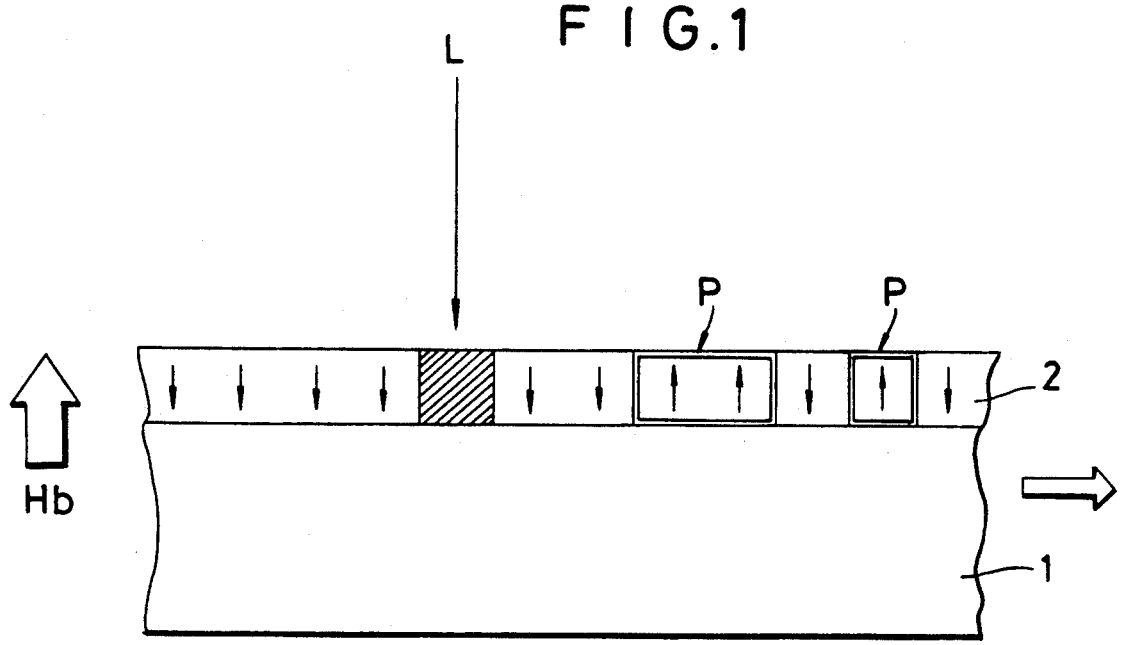
FIG. 1 shows the concept of writing information (pits) into a recording layer 2 on a substrate 1 in an magnetooptical recording system.
Figure 2:
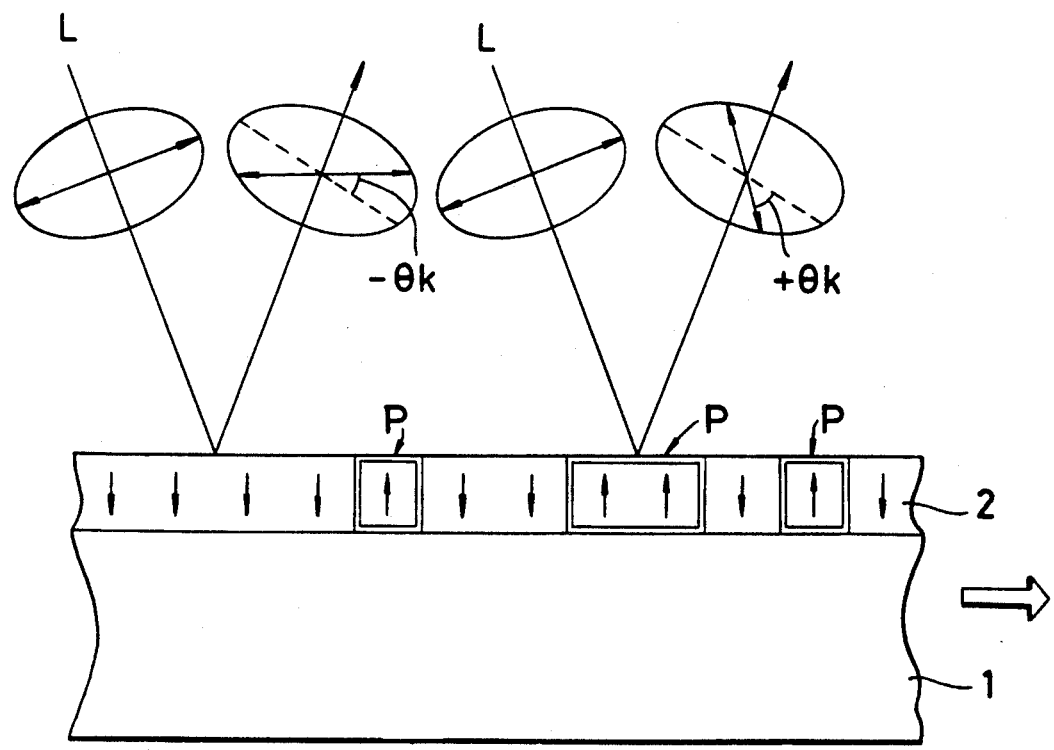
FIG. 2 shows the concept of reading information (pits) from the recording layer in the system of FIG. 2.

The present invention is hereunder shown in greater detail by reference to specific working examples, to which the scope of the invention is by no means limited.

EXAMPLE 1

A recording layer composed of a first overlying layer and a second underlying layer was formed on a glass substrate in an vacuum chamber by electron beam evaporation technique and Fe-Co alloy and a rare earth metal at a rate of 3 Å/sec at a pressure of $1-2 \times 10^6$ Torr.

In the first step, a second layer of $Gd_{23}(Fe_{70}Co_{30})_{77}$ (thickness=500 Å, TH=ca. 375° C., HL=ca. 100 Oe) was formed. Then, without breaking the vacuum, a first layer of $Dy_{28}(Fe_{89}Co_{11})_{72}$ (thickness=500 Å, TL=ca. 130° C., HH=ca. 5000 Oe) was formed. As a result, a sample of magnetooptical recording medium having a dual perpendicular magnetic layer as the recording layer was prepared.

The first layer of $Dy_{28}(Fe_{89}Co_{11})_{72}$ had a low Tc which was substantially equal to that of TbFe, suggesting the possibility of Tc writing under conditions which were substantially equal to those used in Tc writing in the conventional TbFe/Gd/Fe dual recording medium.

The magnetic properties of the first and second layers were measured with a vibrating-sample magnetometer, and as a result of the measurements, the interface wall energy density between the two layers was calculated as $\delta\omega = 1.60$ erg/cm$^2$.

A comparative sample of magnetooptical recording medium was prepared by similar procedures from a dual structure made of a layer of $Dy_{28}Fe_{72}$ (thickness: 500 Å) and a layer of $Gd_{23}Fe_{77}$ (thickness: 500 Å). The interface wall energy density between the two layers was 0.4 erg/cm$^2$. Another comparative sample was prepared using a DyFe/GdCo structure. The $\delta\omega$ value of this sample was 0.5 erg/cm$^2$. A third comparative sample using a TbFe/GdFe structure had a $\delta\omega$ value of 0.4 erg/cm$^2$.

EXAMPLE 2

A sample of magnetooptical recording medium was prepared as in Example 1 except that the first layer was made of $Dy_{24}(Fe_{89}Co_{11})_{76}$ having a thickness, TL and HH of 500 Å, ca. 125° C. and ca. 5000 Oe, respectively, and that the second layer was formed of $Gd_{24}(Fe_{70}Co_{30})_{76}$ having a thickness of 500 Å, TH of ca. 375° C. and HL of ca. 150 Oe. The sample had a $\delta\omega$ value of 1.80 erg/cm$^2$.

EXAMPLE 3

A sample of magnetooptical recording medium was prepared as in Example 1 except that the first layer was made of $Dy_{24}(Fe_{87}Co_{13})_{76}$ having a thickness of 500 Å, TL of ca. 145° C. and HH of ca. 5000 Oe, and that the second layer was formed of $Gd_{23}(Fe_{60}Co_{40})_{77}$ having a thickness of 500 Å, TH of ca. 420° C. and HL of ca. 100 Oe. This sample had a $\delta\omega$ value of 1.85 erg/cm$^2$.

EXAMPLE 4

A sample of magnetooptical recording medium was prepared as in Example 1 except that the first layer was made of $Tb_{22}(Fe_{91}Co_9)_{78}$ having a thickness of 500 Å, TL of ca. 180° C. and HH of ca. 4000 Oe, and that the second layer was formed of $Gd_{24}(Fe_{70}Co_{30})_{76}$ having a thickness of 500 Å, TH of ca. 375° C. and HL of ca. 150 Oe. This sample had a $\delta\omega$ value of 1.87 erg/cm$^2$.

What is claimed is:

1. A magnetooptical recording medium having a perpendicular magnetic layer comprised of a first layer and a second layer, wherein
    the first layer consists essentially of RE-Fe-Co, said RE representing at least one rare earth metal selected from the group consisting of Dy and Tb, said first layer having a predetermined Curie point and a predetermined coercivity; and
    the second layer consists essentially of Gd-Fe-Co, disposed in contact with said first layer defining an interface, said second layer having a predetermined Curie point higher than the predetermined Curie point of said first layer, and a predetermined coercivity lower than the predetermined coercivity of said first layer, said interface having a wall energy density greater than or equal to 1.6 erg/cm$^2$ and less than or equal to 1.87 erg/cm$^2$.

2. The magnetooptical recording medium according to claim 1, wherein the curie points of said first and second layers are such that data can be written on said layers at temperatures between said curie points.

3. The magnetooptical recording medium according to claim 1, wherein said first layer consists essentially of $Tb_\alpha(Fe_{100-\beta}Co_\beta)_{100-\alpha}$ and said second layer consists essentially of $Gd_\alpha(Fe_{100-\beta}Co_\beta)_{100-\alpha}$, provided that $\alpha = 15-34$ atomic % and $\beta = 5-90$ atomic %.

4. The magnetooptical recording medium according to claim 1, wherein said first layer consists essentially of $RE_{\alpha'}(Fe_{100-\beta'}Co_{\beta'})_{100-\alpha'}$, and said second layer consists essentially of $Gd_{\alpha''}(Fe_{100-\beta''}Co_{\beta''})_{100-\alpha''}$, provided that $\alpha' = 15-33$ atomic %, $\beta' = 5-30$ atomic %, $\alpha'' = 16-34$ atomic %, and $\beta'' = 5-90$ atomic %.

5. A magnetooptical recording medium according to claim 4, wherein $\alpha' = 28$ atomic %, $\alpha'' = 23$ atomic %, $\beta' = 11$ atomic %, and $\beta'' = 30$ atomic %.

6. A magnetooptical recording medium according to claim 4, wherein $\alpha' = 24$ atomic %, $\alpha'' = 24$ atomic %, $\beta' = 11$ atomic %, and $\beta'' = 30$ atomic %.

7. A magnetooptical recording medium according to claim 4, wherein $\alpha' = 24$ atomic %, $\alpha'' = 23$ atomic %, $\beta' = 13$ atomic %, and $\beta'' = 40$ atomic %.

8. The magnetooptical recording medium according to claim 3, wherein the first layer consists essentially of $Tb_{22}(Fe_{91}Co_9)_{78}$ and said second layer consists essentially of $Gd_{24}(Fe_{70}Co_{30})_{76}$.

9. A magnetooptical recording medium having a perpendicular magnetic layer, said layer comprising:
    a first layer consisting essentially of RE-Fe-Co, said RE representing at least one rare earth metal selected from the group consisting of Dy and Tb, said first layer having a predetermined Curie point and a predetermined coercivity; and
    a second layer consisting essentially of Gd-Fe-Co, disposed in contact with said first layer defining an interface, said second layer having a predetermined Curie point higher than the predetermined Curie point of said first layer and a predetermined coercivity lower than the predetermined coercivity of said first layer, said interface having a wall energy density greater than or equal to 1.6 erg/cm$^2$ and less than or equal to 1.87 erg/cm$^2$,
    wherein said interface wall energy density is 1.2 erg/cm$^2$ or more higher than an interface wall energy density in a comparable reference magnetic layer having a first reference layer consisting essentially of RE - Fe and a second reference layer consisting essentially of Gd-Fe.

10. The magnetooptical recording medium according to claim 9, wherein said first layer consists essentially of DyFeCo having a thickness of 500 Å, said second layer consists essentially of GdFeCo having a thickness of 500 Å, the first reference layer of the comparable reference magnetic layer consists essentially of DyFe having a thickness of 500 Å, and the second reference layer of the comparable reference magnetic layer consists essentially of GdFe having a thickness of 500 Å.

11. A magnetooptical medium for recording data having a perpendicular magnetic layer, said layer comprising:
- a first layer consisting essentially of an alloy of $RE_{\alpha'}(Fe_{100-\beta'}Co_{\beta'})_{100-\alpha'}$, said RE representing at least one rare earth metal selected from the group consisting of Dy and Tb, said first layer having a predetermined Curie point and a predetermined coercivity, provided that $\alpha' = 15-33$ atomic % and $\beta' = 5-30$ atomic %; and
- a second layer consisting essentially of an alloy of $Gd_{\alpha''}(Fe_{100-\beta''}Co_{\beta''})_{100-\alpha''}$ disposed in contact with said first layer to define an interface, said second layer having a predetermined Curie point higher than the predetermined Curie point of said first layer, and a predetermined coercivity lower than the predetermined coercivity of said first layer, provided that $\alpha'' = 16-34$ atomic %, and $\beta'' = 5-90$ atomic %, said interface having a wall energy density greater than or equal to 1.6 erg/cm$^2$ and less than or equal to 1.87 erg/cm$^2$, wherein the data is recorded in said second layer and transferred to said first layer without a loss of the recorded data in said second layer due to said interface wall energy density.

12. A magnetooptical recording medium having a first perpendicular magnetic layer comprising Fe, Co, and at least one rare earth metal selected from the group consisting of Dy and Tb, and a second perpendicular magnetic layer comprising Gd, Fe, and Co, wherein said second layer has a predetermined Curie point higher than a predetermined Curie point of said first layer, and a predetermined coercivity lower than a predetermined coercivity of said first layer, said first and second layers defining an interface having a wall energy density of greater than or equal to 1.6 erg/cm$^2$ and less than or equal to 1.87 erg/cm$^2$.

* * * * *

UNITED STATES PATENT AND TRADEMARK OFFICE
CERTIFICATE OF CORRECTION

PATENT NO. : 5,204,193
DATED      : April 20, 1993
INVENTOR(S): Masatoshi Sato et al.

It is certified that error appears in the above-indentified patent and that said Letters Patent is hereby corrected as shown below:

Claim 2, column 8, line 11, change "curie" to --Curie--.

Claim 2, column 8, line 13, change "curie" to --Curie--.

*Claim 3, column 8, line 17, change "$100-\alpha,$"
 to --$100-\alpha',$--.

*Claim 4, column 8, line 21, change "$100-\alpha$"
 to --$100-\alpha'$--.

Signed and Sealed this

Thirtieth Day of August, 1994

Attest:

BRUCE LEHMAN

Attesting Officer        Commissioner of Patents and Trademarks